United States Patent [19]

McAnaney et al.

[11] Patent Number: 5,534,141

[45] Date of Patent: Jul. 9, 1996

[54] WASTEWATER TREATMENT SYSTEM WITH IN-POND CLARIFIER

[75] Inventors: David W. McAnaney, Eden Prairie, Minn.; John R. Dorner, Mequon, Wis.

[73] Assignee: The Lemna Corporation, Mendota Heights, Minn.

[21] Appl. No.: 353,546

[22] Filed: Dec. 9, 1994

[51] Int. Cl.⁶ .................................................. B01D 21/02
[52] U.S. Cl. .................. 210/110; 210/112; 210/138; 210/170; 210/195.3; 210/202; 210/242.1; 210/258; 210/521
[58] Field of Search ..................................... 210/747, 170, 210/110, 138, 143, 202, 207, 221.2, 242.1, 258, 521, 522, 112, 195.3

[56] References Cited

U.S. PATENT DOCUMENTS

| | | | |
|---|---|---|---|
| 3,618,773 | 11/1971 | Jacquet | 210/242.1 |
| 4,008,155 | 2/1977 | Castell | 210/242.1 |
| 4,346,005 | 8/1982 | Zimmerman | 210/242.1 |
| 4,377,477 | 3/1983 | Dunkers | 210/242.1 |
| 4,381,237 | 4/1983 | Svensson | 210/138 |
| 4,608,157 | 8/1986 | Graves | 210/202 |
| 4,780,206 | 10/1988 | Beard et al. | 210/522 |
| 4,865,753 | 9/1989 | Meurer | 210/242.1 |
| 4,950,396 | 8/1990 | Skaar et al. | 210/221.2 |
| 5,011,604 | 4/1991 | Wilde et al. | 210/747 |
| 5,180,501 | 1/1993 | Ngo et al. | 210/747 |

OTHER PUBLICATIONS

"Biolac Treatment® System Retro–Clar™ Floating Clarifier", Parkson Corporation.
"Biolac® Wastewater Treatment System", Parkson Corporation.

Primary Examiner—Peter A. Hruskoci
Assistant Examiner—Theodore M. Green
Attorney, Agent, or Firm—Kinney & Lange

[57] ABSTRACT

A wastewater treatment system for deployment in a body of water having a floor and a water surface includes an in-pond clarifier extending across the body of water. The in-pond clarifier defines a clarifying chamber and includes an upper portion and a lower portion. The upper portion is suspended above the wastewater surface. The lower portion is maintained adjacent to the floor of the body of water. As a result, the body of water is divided into distinct treatment zones on opposite sides of the clarifying chamber. The in-pond clarifier further includes a plurality of pumps for removing biological solids which settle within the clarifying chamber. Separate pumps are provided for either returning settled solids to the body of water or for wasting settled solids from the body of water.

41 Claims, 4 Drawing Sheets

WASTEWATER TREATMENT SYSTEM WITH IN-POND CLARIFIER

BACKGROUND OF THE INVENTION

The present invention relates to pond based wastewater treatment systems. In particular, the present invention relates to a wastewater treatment system in which an in-pond clarifier acts as a baffle to separate two distinct treatment zones and in which the in-pond clarifier is provided with separate solid removal means for returning settled solids to a treatment zone and separate solid removal means for wasting settled solids from the clarifier to eliminate mechanical means required for collecting the settled solids.

Wastewater may originate from a variety of sources both domestic and industrial. The characteristics of the particular wastewater will vary depending upon its source. The characteristics of the wastewater are typically quantified by principal treatment parameters including biochemical oxygen demand (BOD), chemical oxygen demand (COD), total suspended solids (TSS), nitrogen (N), phosphorus (P) and other pollutants. Treatment of the wastewater reduces the concentration of these parameters to within acceptable ranges.

Treatment of the wastewater may be performed with a variety of different treatment methods or processes. Each method or process produces different by-products and different concentrations of the treatment parameters. Each treatment process may involve several treatment stages whereby the concentration of the measured parameters is reduced to acceptable limits. The treatment stages may be separated from one another by use of a serpentine channel employing a plug flow arrangement or by batch processing.

In some systems, wastewater being treated in one particular process or within one particular treatment stage must be isolated or substantially separated from consecutive treatment processes or stages. For example, treatment stages utilizing aquatic plants such as duckweed which take in nutrients from the wastewater preferably are provided with a quiescent environment. The quiescent environment allows the aquatic plants to form a mat or uniform cover over the wastewater surface and also allows sedimentation of solids and other particulates. In contrast, treatment stages which employ aerobic, anoxic or anaerobic suspended growth processes preferably agitate or mix the wastewater to increase treatment efficiency. Thus, treatment stages utilizing aquatic plants and treatment stages utilizing aerobic, anoxic or anaerobic suspended growth processes are preferably isolated from one another.

Isolation of the wastewater within one treatment process or stage from wastewater within an adjacent to treatment process or stage has typically been achieved by employing separate containment structures or ponds for each different process or stage or by employing a hydraulic baffle to compartmentalize a single containment structure pond into several isolated treatment zones. Using separate containment structures or ponds requires additional land space and increases the cost of such a system.

Employing a hydraulic baffle to separate treatment processes or stages is less expensive and permits existing ponds to be used in the selected system. Hydraulic baffles typically comprise a single wall extending from the wastewater surface to the bottom of the containment structure or pond. In addition to isolating treatment processes or stages, baffles are also used to provide a channelized, serpentine flow to maximized detention time within the system. Baffles are typically made from a variety of materials including concrete, wood or fabric.

Natural wastewater treatment may be achieved by an anaerobic process, an anoxic process, an aerobic process or a combination of the treatment processes. To anaerobically treat wastewater, the wastewater must be exposed to anaerobic micro-organisms or bacteria. The bacteria reproduce and convert organics in the wastewater into the additional by-products of carbon dioxide and methane. This conversion is done in the absence of $O_2$, $NO_3$ and $SO_4$. During this conversion, protons are transferred to carbon atoms to form methane. Phosphorus is conditioned for removal in downstream aerobic processes.

To provide anoxic treatment, the wastewater must be exposed to facultative micro-organisms or bacteria. The bacteria produce and convert organics in the wastewater into additional by-products of carbon dioxide and methane. This conversion is done in the absence of $O_2$. During this conversion, methane and nitrate are converted to nitrogen gas.

Similar to anaerobic wastewater treatment, aerobic wastewater treatment utilizes bacteria which contact and convert organics within the wastewater to treat the wastewater. However, in contrast to anaerobic wastewater treatment, aerobic wastewater treatment utilizes aerobic microorganisms or bacteria which are active in the presence of free oxygen. The aerobic micro-organisms or bacteria reproduce during the process and convert organic matter into the additional by-products of $CO_2$, $NO_3$ and $NO_2$.

Although anaerobic, anoxic and aerobic wastewater treatment processes utilize different bacteria and result in different by-products, all of the processes rely upon contact of micro-organisms or bacteria with organics within the wastewater. Thus, in all of the processes it is important that contact between the bacteria and the wastewater is maximized by mixing the wastewater and the bacteria.

During anaerobic, anoxic and aerobic digestion of organics within the wastewater to be treated, the bacteria become attached to solid waste, other bacteria or other media suspended within the wastewater. As a result, bacteria may become clustered within distinct areas or pockets of the wastewater. Therefore, the wastewater is typically mixed to maximize the volume of wastewater coming into contact and being digested and converted by the bacteria.

The time the process requires to convert organics and the system's efficiency for removing organics depends upon the number of bacteria in the wastewater during treatment. Moreover, because bacteria die, the bacteria count is also critical to the survival of the system. Thus, any anaerobic, anoxic or aerobic process must ensure that the number of bacteria in the system is maintained. However, removing the effluent from the system also removes many of the bacteria suspended in the wastewater. This loss of bacteria, if left uncorrected is known as insufficient solids retention and results in poor treatment efficiency and eventual failure of the anaerobic, anoxic or aerobic wastewater treatment system.

In an attempt to prevent insufficient solids retention, conventional systems have employed reactors with large detention times, reactors with fixed media or reactors with intensive management of microbial populations. Other reactors or digestors have attempted to increase solids retention by the addition of a settling step in the process whereby solids containing the bacteria (activated sludge) are settled out of the wastewater and are returned to the system (return activated sludge). Conventional systems employ external settling in a clarifier to achieve solids retention. However, these systems are not efficient because transportation of the wastewater to an external settling clarifier alters the settling characteristics and increases the amounts of solids suspended in the wastewater. Consequently, more time is needed to sufficiently settle out the bacterial solids.

Another system which uses settling is a sequencing batch reactor. These reactors use internal settling to achieve a high efficiency or organic removal. However, the batch reactor is incapable of handling a continuous flow of wastewater. Instead, the wastewater must be treated in batches. As a result, a wastewater storage facility is normally required for holding effluent while a batch reacts.

Other systems have attempted to achieve increased solids retention through the use of filters and sludge blankets. Systems using anaerobic filters require media to increase solids retention. These systems have a high efficiency of removal and are resilient to shutdowns and temperature changes. However, the required media is expensive. Systems employing an up-flow anaerobic sludge blanket reactor use a floating blanket of sludge to remove bacterial solids from the effluent. Although this achieves a high efficiency of removal, such a system is difficult to manage.

Although it is important to prevent excessive loss of aerobic bacteria from an aerobic wastewater treatment system, it is also important that a number of aerobic bacteria within the system does not become excessive. An excessive number of aerobic bacteria in the system produces an unhealthy biological culture and thereby reduces the system's effectiveness at treating the waster water. As a result, solids or activated sludge containing the aerobic bacteria must be periodically removed or wasted from the system (waste activated sludge). Typically, one to five percent of the activated sludge or settled solids are wasted from the system. The waste activated sludge is typically transferred to a biosolids retention or treatment facility. Treatment of the waste activated sludge requires that the waste activated sludge be highly concentrated and thickened. As a result, activated sludge is typically thickened within the clarifier before being removed from the system.

Examples of clarifiers which return activated sludge to the system and which also waste activated sludge from the system include floating clarifiers and integral clarifiers. Conventional floating clarifiers employ elaborate thickening and collection mechanisms for removing solids from the in-pond clarifier. Floating clarifiers are conventionally positioned along the perimeter or side of the pond opposite the inlet and adjacent to the outlet so that the elaborate thickening and collection mechanisms can be accessible from the perimeter of the pond. A typical floating clarifier comprises a metallic enclosure which defines a clarifier compartment having a V-shaped cross-section. A rake is used to collect and thicken all of the settled solids along the compartment bottom so that at least a portion of the settled solids may be wasted. A single air lift pump inlet device extends along the entire bottom of the clarifier compartment. The single air lift pump removes both return activated sludge and waste activated sludge from the bottom of the clarifier compartment. Once removed from the clarifier, the settled solids or sludge is divided into two portions. A first portion (return activated sludge) is returned to the treatment pond while a second portion (waste activated sludge) is wasted from the system. Typically, the return activated sludge is returned to the pond through a single outlet.

Integral clarifiers are typically formed as part of the containment structure or pond and are formed along the perimeter or boundary of the containment structure adjacent to the effluent outlet. Integral clarifiers typically comprise a partition wall which floats adjacent to the wastewater surface and extends downward to separate the integral clarifier from the rest of the pond. Influent to the integral clarifier flows between the floor of the pond and the partition wall. A hopper is formed at the bottom of the integral clarifier to simplify sludge concentration and removal. Similar to floating clarifiers, integral clarifiers include a single or dual air lift pump which extends along the hopper bottom and a flocculation rake. The flocculation rake is used to thicken all of the settled solids along the hopper bottom so that at least a portion of the settled solids may be wasted. The single or dual air lift pump removes both return activated sludge and waste activated sludge.

Because conventional floating clarifiers and integral clarifiers utilize a single or dual air lift pump to remove both return activated sludge and waste activated sludge, which must later be separated, and because conventional floating clarifiers and integral clarifiers are located on a perimeter or edge of the treatment pond or containment structure, several inefficiencies result. Because both clarifiers utilize a single or dual air lift pump to remove both return activated sludge and waste activated sludge together, equipment must be provided for splitting or separating the return activated sludge and the waste activated sludge within the single outflow stream of sludge. Furthermore, because the return activated sludge and the waste activated sludge are not separated until after they are removed from the clarifier, both portions of the settled solids must be highly concentrated and thickened before being removed from the clarifier. Although waste activated sludge typically comprises between about one to five percent of the total settled solids, all of the settled solids must be thickened and concentrated. Thickening and concentrating the return activated sludge is counterproductive since the concentration of the return activated sludge is preferably low to enhance mixing of the return activated sludge with the wastewater once it is returned to the wastewater. Because the return activated sludge is returned to the pond through a single outlet, the solids returned to the treatment pond are further concentrated and require additional mixing to sufficiently disperse the bacteria within the wastewater.

At the same time, because it is also necessary that all of the settled solids be thickened and concentrated as much as possible, both conventional clarifiers include a rake which mechanically operates adjacent to the floor of the clarifier compartment to thicken and concentrate all the settled solids adjacent to the floor of the compartment. Because the rake constitutes a mechanical component which must be moved adjacent to the floor of the clarifier compartment, both clarifiers are expensive and difficult to maintain. Moreover, because the rake typically contacts and engages the walls of the clarifier enclosure or hopper, the walls of the clarifier enclosure or hopper must be made of a rigid, stronger material such as metal or concrete to prevent tearing of the enclosure or hopper walls. As a result, the enclosure or hopper is also more expensive, heavier and difficult to transport and set up.

Furthermore, because floating clarifiers and integral clarifiers are typically positioned adjacent to a perimeter of the pond, solids cannot be easily returned to an intermediate location within the pond to further enhance remixing of the return activated sludge with the wastewater. Instead, conventional clarifiers require extensive return activated sludge piping. Consequently, a large amount of energy is required for returning the return activated sludge to the pond. This additional energy is typically supplied by a subsidiary pump, such as a centrifugal pump, outside of the clarifier. The additional pumping required to return the solids shears the interconnections between the bacterial solids (also known as floc) to reduce particle size. As a result, future settling of the bacteria is more difficult because of the smaller floc or particle size.

SUMMARY OF THE INVENTION

The present invention is an improved wastewater treatment system. The wastewater treatment system is deployed in a body of water having a floor and a water surface and includes an in-pond clarifier extending across the body of water. The in-pond clarifier defines a clarifying chamber and includes an upper portion and a lower portion. The upper portion is suspended above the wastewater surface. The lower portion is maintained adjacent to the floor of the body of water. As a result, the body of water is divided into distinct treatment zones on opposite sides of the clarifying chamber. Thus, the in-pond clarifier also serves as a baffle.

The in-pond clarifier further includes a plurality of pumps for removing biological solids which settle within the clarifying chamber. Separate pumps are provided for either returning settled solids to the body of water or for wasting settled solids from the system. Because separate pumps are provided for removing settled solids from the clarifying chamber and returning the settled solids to the body of water and because separate pumps are provided for removing settled solids from the clarifying chamber and wasting the settled solids, several advantages are achieved. For example, because only a small portion of the settled solids needs to be thickened, expensive and high maintenance or elaborate mechanical thickening and collection mechanisms are unnecessary. In addition, the settled solids that are actually returned to the body of water have a lower concentration and are therefore more easily mixed with the wastewater. Furthermore, because the in-pond clarifier is deployed across the pond, the settled solids need only be pumped a short distance before being returned to a central portion of the body of water. Lower energy is required for returning the sludge than other clarifiers with return sludge piping. The lower energy used preserves the integrity of the biological floc particles. The present wastewater treatment system allows wastewater to be treated using distinct treatment processes within distinct treatment zones more effectively and at a lower cost.

DETAILED DESCRIPTION OF THE PREFERRED EMBODIMENTS

Figure 1:
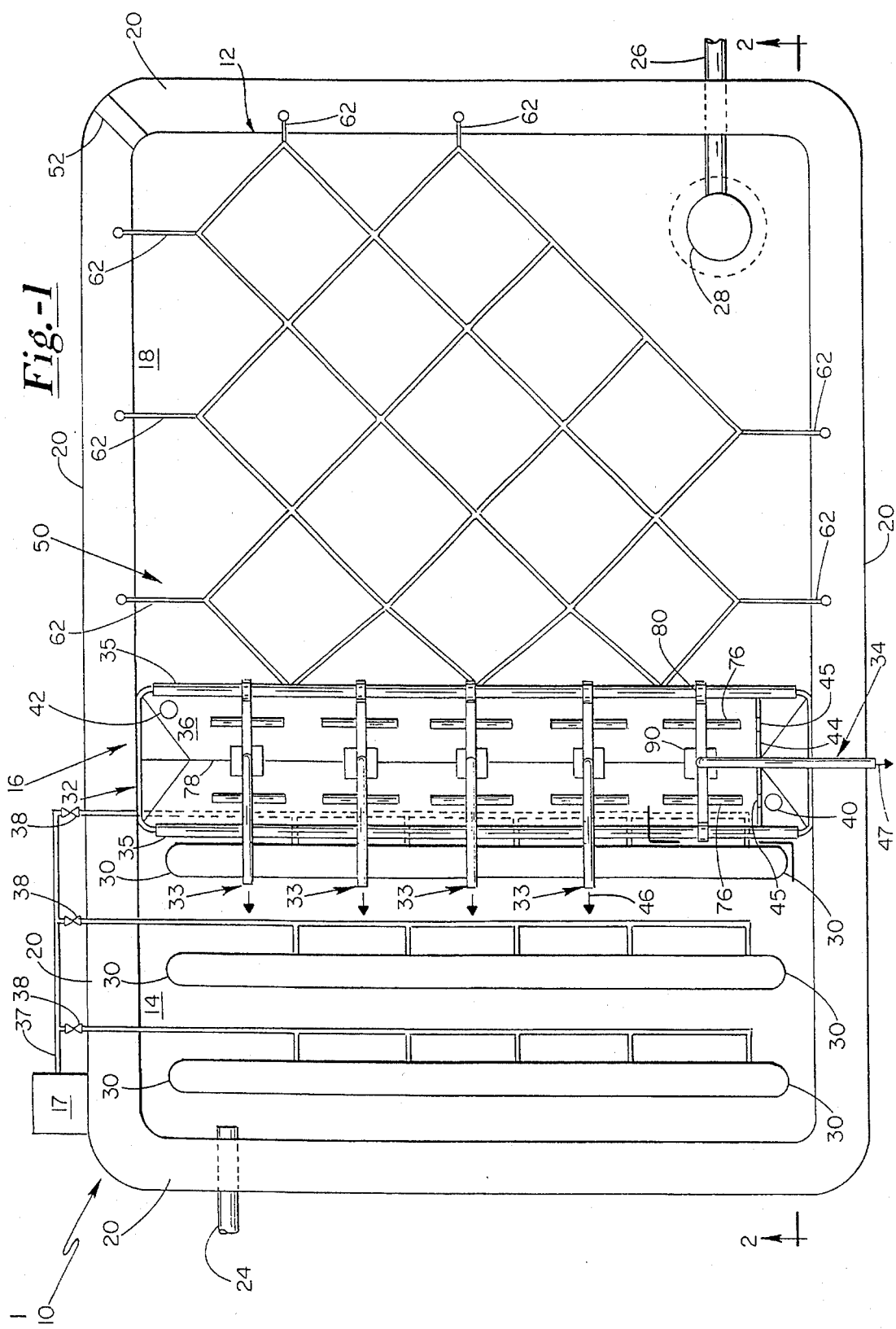
FIG. 1 is a top view of a wastewater treatment system including an in-pond clarifier.

FIG. 1 is a top view of wastewater treatment system 10. System 10 generally includes pond 12, wastewater treatment zone 14, clarifier 16, blower 17 and wastewater treatment zone 18. Pond 12 is preferably a body of water surrounded by the plurality of earthen berms 20 and floor 22 (shown in FIG. 2). Alternatively, pond 12 may be formed from a variety of materials such as concrete, metals or plastics. In addition, pond 12 may have a variety of depths and shapes other than the generally rectangular shape shown in FIG. 1. As can be appreciated, pond 12 may be natural or man-made.

Pond 12 further includes inlet 24 and outlet 26. Although schematically shown, inlet 24 and outlet 26 preferably include pipes or other fluid conduit structures whereby the flow of untreated wastewater into pond 12 and the flow of treated wastewater or effluent out of pond 12 may be limited or regulated. Alternatively, inlet 24 and outlet 26 constitute channels extending through berms 20. Inlet 24 and outlet 26 are preferably positioned on opposing sides of pond 12. Outlet 26 is further provided with a control structure 28 which maintains the water level or depth of the pond. Control structure 28 preferably comprises a vertical adjustable plate which forms an overflow.

Treatment zone 14 is located adjacent to inlet 24 and is defined by floor 22 (shown in FIG. 2) and berms 20 of pond 12 and clarifier 16. Treatment zone 14 is preferably a reactor that aerobically treats wastewater received through inlet 24. The wastewater to be treated generally contains carbonacious COD and BOD, phosphorus, nitrogen and adsorbable pollutants. Bacteria within treatment zone 14 convert the dissolved organic waste material, phosphorus and nitrogen into stable by-products including carbon dioxide, nitrates, nitrites, water and biological solids (sludge) through processes including biodegradation and nitrification. During biodegradation and nitrification, the bacteria attach themselves to the suspended solids within the wastewater. For proper biodegradation and nitrification, both the wastewater containing dissolved organic waste and air must come into contact with the bacteria.

Treatment zone 14 includes mixers 30. Mixers 30 extend across treatment zone 14 within pond 12. Mixers 30 are preferably positioned near the floor 22 of pond 12 within treatment zone 14. Mixers 30 preferably comprise fine bubble diffused air aerators. Compressed air is supplied from blower 17 which includes regulation means. As a result, compressed air supplied by mixers 30 mixes both the wastewater and the biological solids to maximize contact between the bacteria and the dissolved organics within the wastewater and aerates the wastewater to maximize the treatment of the wastewater. Alternatively, mixers 30 may comprise mechanical surface aerators to provide both mixing and aeration.

Alternatively, treatment zone 14 may utilize an anoxic-process, an anaerobic treatment process or both. With an anoxic treatment process, bacteria within treatment zone 14 convert the dissolved organic waste material into carbon dioxide, methane and biological solids (sludge) in the absence of oxygen. With an anaerobic process, bacteria within treatment zone 14 convert the dissolved organic waste material into carbon dioxide, methane and biological solids (sludge) in the absence of oxygen, nitrate or sulfates. For treatment, the wastewater containing dissolved organic waste must come into contact with the anaerobic bacteria or sludge in the absence of oxygen. Where treatment zone 14 utilizes an anaerobic treatment process, mixers 30 preferably do not utilize air to mix the wastewater and the biological solids. Alternatively, mixers 30 may include mechanical mixing mechanisms or may utilize methane gas or the wastewater itself as a means for mixing the biological solids and the wastewater.

Clarifier 16 extends across pond 12 and separates treatment zone 14 from treatment zone 18. Clarifier 16 generally includes enclosure 32 and air lift pumps 33 and 34. Enclosure 32 extends across pond 12 and includes flotation devices 35. Enclosure 32 has opposite ends which are secured to berms 20 and extends from above the surface of the wastewater within pond 12 to floor 22 (shown in FIG. 2) of pond 12. Because enclosure 32 extends above the surface of the wastewater within pond 12, enclosure 32 defines a clarifying chamber 36 substantially distinct and isolated from treatment zone 14 and treatment zone 18. Because enclosure 32 extends to floor 22 of pond 12, enclosure 32 further divides and separates treatment zone 14 from treatment zone 18. Consequently, treatment zone 14 and treatment zone 18 are distinct from one another.

Blower 17 is schematically shown and includes air lines 37 and valves 38. Air lines 37 are coupled to mixers 30 of treatment zone 14 and air lift pumps 33, 34 of clarifier 16. Blower 17 provides compressed air to mixers 30 and air lift pumps 33, 34 through air lines 37. Alternatively, separate blowers may be provided for mixers 30 and air lift pumps 33, 34.

Valves 38 are coupled to air lines 37. Valves 38 regulate or control the volume of air supplied through each individual air line 37 to mixers 30 and air lift pumps 33, 34 to maximize settling and sludge return/removal efficiency. Blower 17 further includes timers and as are conventionally known. The timers of blower 17 regulate valves 38 and permit compressed air to be supplied to mixers 30 and air lift pumps 33, 34 at preselected timed intervals. As a result, each individual air lift pump 33, 34 may be supplied with compressed air and thereby be operated at different times to improve settling characteristics of clarifier 16 and to improve mixing within treatment zone 14.

Enclosure 32 includes inlet 40, outlet 42, baffle 44, and a series of air lift pump mounting structures or frames 48. Inlet 40 and outlet 42 are preferably selectively sized windows in communication with chamber 36. Inlet 40 and outlet 42 are preferably sized so that wastewater entering and exiting chamber 36 has a velocity which enhances settling in the chamber. Inlet 40 and outlet 42 are preferably positioned on opposite ends of enclosure 32 and pond 12. Inlet 40 is preferably positioned at a greater depth than the depth of outlet 42 to improve settling characteristics of clarifier 16. Inlet 40 permits the wastewater and biological solids to enter clarifying chamber 36 of enclosure 32. Outlet 42 permits effluent wastewater to exit from clarifying chamber 36 into treatment zone 18. Because inlet 40 and outlet 42 are positioned at opposite ends of enclosure 32, wastewater entering through inlet 40 must flow along the entire length of enclosure 32 before being permitted to exit through outlet 42. Consequently, most of the biological solids carrying bacteria settle out of the wastewater.

Furthermore, because clarifying chamber 36 is substantially isolated from treatment zone 14 and mixers 30, wastewater within enclosure 32 does not become agitated. Because inlet 40 and outlet 42 are positioned along opposite ends away from inlet 24 and outlet 26, respectively, of pond 12, and because the length of enclosure 32 extends perpendicular to the direction of flow through inlet 24 and outlet 26, velocity of the wastewater through clarifier 34 is low. As a result, suspended biological solids carrying bacteria substantially settle to a bottom of clarifying chamber 36.

Baffle 44 extends transversely across clarifying chamber 36 between inlet 40 and outlet 42. Baffle 44 is preferably positioned proximate to inlet 40. Preferably, baffle 44 comprises a non-porous fabric sheet heat welded to sides of clarifying chamber 36. Baffle 44 defines a flow passage 45 substantially smaller than the cross-sectional area of clarifying chamber 36. Preferably, flow passage 45 comprises at least one window positioned near to inlet 40 near the bottom of clarifying chamber 36 to enhance settling. Alternatively, flow passage 45 comprises several smaller perforations through baffle 44. Furthermore, baffle 44 may also be made of a porous material which distribute the flow of wastewater uniformly through the baffle at reduced velocity. As a result, baffle 44 further dissipates velocity currents from treatment zone 14 to enhance settling of biological solids within enclosure 32.

Frames 48 are positioned within clarifying chamber 36 along the elongate length of clarifier 16. Frames 48 are preferably integral with air lift pumps 33, 34. Alternatively, frames 48 may be mounted to air lift pumps 33, 34. Frames 48 support and maintain air lift pumps 33 at a desired location within and along clarifying chamber 36. In the preferred embodiment, frames 48 also serve to define the geometry of clarifying chamber 36. As can be appreciated, a single elongate frame member may alternatively be used in lieu of a series of individual frame members.

Air lift pumps 33 and 34 are spaced apart from one another along the entire elongate length of enclosure 32. Each air lift pump 33, 34 extends to near a bottom of clarifying chamber 36 and includes a valve on an airline to provide positive, controlled compressed air from blower 17 for lifting and removing settled solids from the bottom of clarifying chamber 36.

Air lift pumps 33 return biological solids carrying bacteria (return activated sludge) which has settled to the bottom of clarifier chamber 36 to treatment zone 14 by lifting the activated sludge over flotation device 35, enclosure 32 as schematically indicated by arrows 46. Air lift pumps 33 are preferably equally spaced from one another.

Towards outlet 42, settled solids are generally not as thick or as concentrated as the settled solids near inlet 40. As a result, the return activated sludge removed by air lift pumps 33 have a lower concentration and is more easily mixed by mixers 30.

Air lift pump 34 removes or wastes excess activated sludge (waste activated sludge) from pond 12 to prevent an excess amount of activated sludge within treatment zone 14 and to maintain the bioculture of treatment zone 14 in a healthy range. Preferably, the removed biosolids (waste activated sludge) are transferred to a retention/treatment pond as schematically indicated by arrow 47. Air lift pump 34 is preferably located near inlet 40 on an opposite side of baffle 44. Because air lift pump 34 is used solely for the removal of waste activated sludge, and because air lift pumps 33 are used solely for the removal of return activated sludge to treatment zone 14, only the settled solids specifically removed by air lift pump 34 need to be thickened. Because air lift pump 34 is located towards inlet 40 which generally has the highest concentration and is the thickest of the sludge within enclosure 32, additional settling equipment such as rakes or other mechanical components are not necessary. As a result, clarifier 16 includes no mechanical parts and is therefore less expensive, easier to set up and easier to maintain. Furthermore, because clarifier 16 is centrally located across pond 12 rather than being located along a perimeter of pond 12 and because air lift pumps 33 return activated sludge through multiple outlets, return activated sludge is merely transported a short distance over enclosure 32 by air lift pumps 33 and is dispersed back into a central portion of treatment zone 14 at a lower concentration. Consequently, extensive return sludge piping is not needed and mixing the return activated sludge with the dissolved organics in the wastewater is enhanced.

Treatment zone 18 is located on the opposite side of clarifier 16 from treatment zone 14 and is defined by berms 20 and floor 22 (shown in FIG. 2) of pond 12 and clarifier 16. Treatment zone 18 is located adjacent to outlet 26. Treatment zone 18 is preferably a polishing zone whereby aquatic plants such as duckweed take in nutrients within the wastewater including nitrates, ammonia and phosphates. Where the aquatic plants are duckweed, the duckweed form a mat on the water surface. The mat prevents photosynthesis in the water below and inhibits the growth of algae. Consequently, anaerobic conditions prevail below the mat to allow anaerobic treatment of the wastewater. Moreover, because the mat prevents photosynthesis below the duckweed mat, anaerobic mineralization also occurs. Sedimentation of microbiofloc, solids and other particulates is also enhanced in the quiescent conditions created by the barrier grid and duckweed mat. Organic matter contained in settled solids decomposes and release soluble forms of BOD in addition to gaseous products, carbon dioxide and methane.

At the same time, aerobic decomposition occurs within the aerobic environment of the plant mat. Heterotrophic organisms utilize organic matter and reduce BOD. Furthermore, hydrogen sulfide ($H_2S$), a by-product of decomposition, is also produced but is oxidized to form sulfuric acid ($H_2SO_4$) within the aerobic duckweed mat. This process prevents the emergence of odors from the pond. Alternatively, treatment zone 18 may involve any one of a variety of different wastewater treatment processes including either aerobic, anaerobic or both processes.

Treatment zone 18 includes floating barrier grid 50 and ramp 52. Floating barrier grid 50 extends along a majority of the surface of wastewater within treatment zone 18 and is substantially described in Ngo et al. U.S. Pat. No. 5,096,577 which issued on Mar. 17, 1992 and which was assigned to The Lemna Corporation. Floating barrier grid 50 reduces wind and wave action to allow the aquatic plants such as duckweed to achieve a full-mat cover.

Ramp 52 extends from berms 20 down to the water surface adjacent to treatment zone 18. Ramp 52 permits the aquatic plants grown in treatment zone 18 to be harvested for various purposes.

Figure 2:
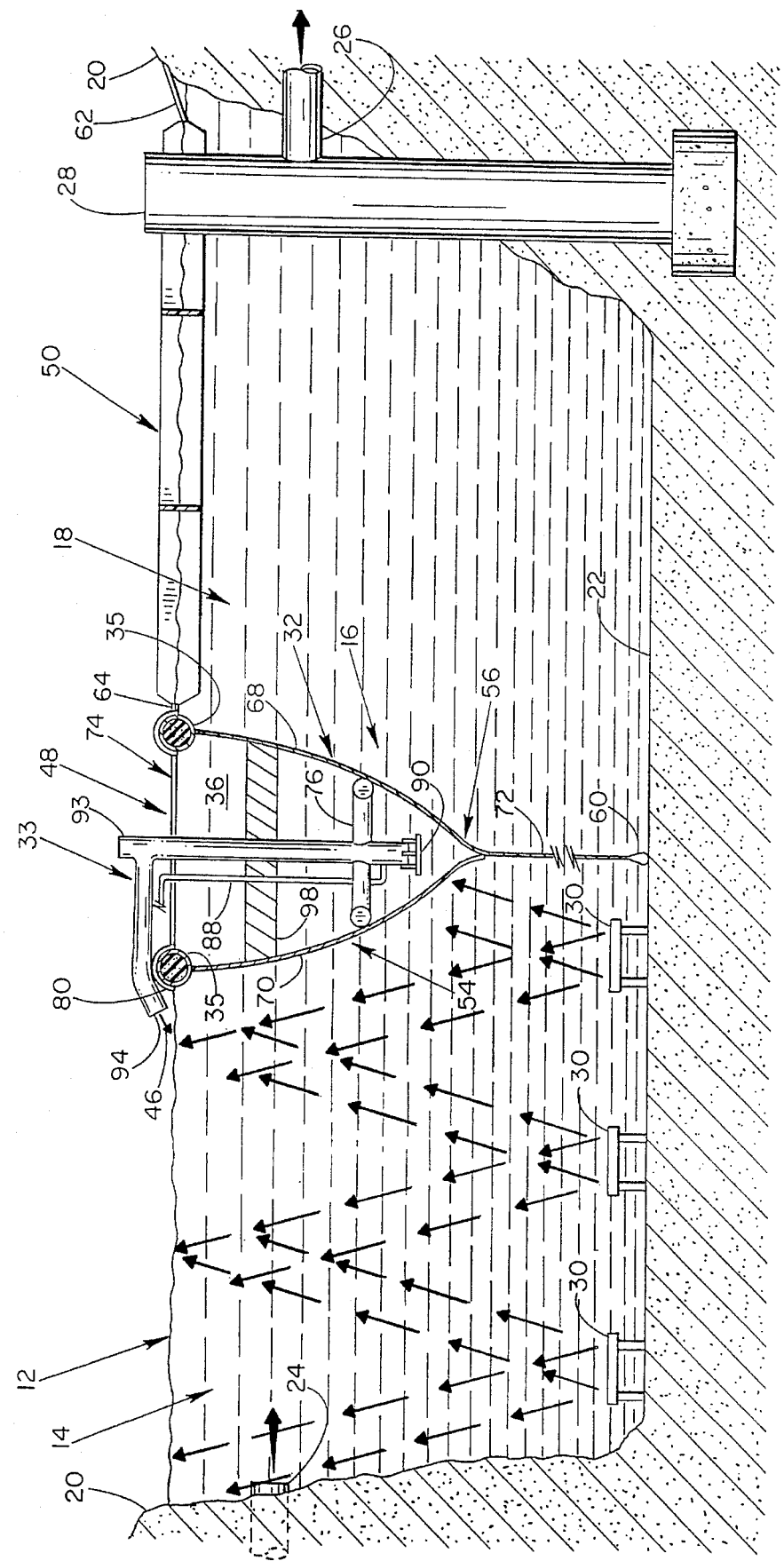
FIG. 2 is a cross-sectional view taken along lines 2—2 of FIG. 1.

FIG. 2 is a cross-sectional view of wastewater treatment system 10 taken along lines 2—2 of FIG. 1. FIG. 2 illustrates treatment zone 14, clarifier 16 and treatment zone 18 in greater detail. As shown by FIG. 2, mixers 30 of treatment zone 14 extend along floor 22 of pond 12 and preferably comprise fine bubble diffused air aerators which are supplied with compressed air from blower 17 (shown in FIG. 1). The compressed air mixes and aerates wastewater within treatment zone 14.

As best shown by FIG. 2, enclosure 32 of clarifier 16 has an upper portion 54 adjacent to the water surface and a lower portion 56 maintained adjacent to floor 22 of pond 12 so that clarifier 16 also acts as a baffle for separating treatment zone 14 and treatment zone 18. Preferably, enclosure 32 is substantially Y-shaped with upper portion 54 having a V-shaped configuration. As a result, biological solids (activated sludge) settle within upper portion 54 towards the bottom of the V-shaped configuration whereby the biological solids are drawn up through air pumps 36 and returned over flotation devices 35 to treatment zone 14. Preferably, clarifying chamber 36 within upper portion 54 of enclosure 32 is approximately ten feet deep. Because clarifying 16 does not require biological solids to be lifted a substantial distance, air lift pumps may be used to return the biological solids to treatment zone 14. As can be appreciated, enclosure 32 of clarifier 16 may have a variety of different shapes and configurations. For example, enclosure 32 may alternatively have a V-shaped or U-shaped configuration which extends to floor 22 of pond 12.

Upper portion 54 is preferably suspended or supported adjacent to the water surface by flotation devices 35. Flotation devices 35 maintain upper portion 54 adjacent to the water surface regardless of changes in the depth wastewater contained in pond 12. Moreover, flotation devices 35 are inexpensive, easy to set up and easy to maintain. As can be appreciated, various other mechanisms such as suspension lines may also be used for supporting upper portion 54 of enclosure 32 adjacent to the water surface.

Lower portion 56 is maintained adjacent to and in contact with floor 22 of pond 12 by a weighted member 60. Weighted member 60 is preferably a chain weight which extends along floor 22 of pond 12. As a result, a seal is formed between lower portion 56 and floor 22 of pond 12 to isolate treatment zone 14 from treatment zone 18. Because weighted member 60 is preferably a chain weight, lower portion 56 of enclosure 54 is maintained in contact with floor 22 regardless of uneven contours present along floor 22. Moreover, weighted member 60 is inexpensive, is easily maintained and does not require any special attachments, mounts or structures. Alternatively, lower portion 56 of enclosure 32 may be maintained adjacent to floor 22 by any well-known attachment structure such as tiedowns, weighted anchors or the like.

Barrier grid 50 is suspended adjacent to the wastewater surface and is mounted to berm 20 and clarifier 16. Barrier grid 50 preferably includes flotation devices for flotation along the water surface. Barrier grid 50 is preferably mounted or secured to berm 20 by shoreline anchors 62. Barrier grid 50 is also preferably mounted or secured to clarifier 16 by mounting mechanism 64.

Outlet 26 is preferably positioned near the surface of pond 12 but slightly below barrier grid 50. Outlet 26 is well-known and defines an opening (not shown) in communication with wastewater within pond 12 through which wastewater enters into outlet 26 and is discharged from pond 12 by outlet 26. Consequently, wastewater just below the floating aquatic plants is discharged through outlet 26 from treatment system 10 while particles and other contaminates within the wastewater below outlet 26 are permitted to settle to floor 22 of pond 12. Control structure 28 is positioned adjacent to outlet 26 and acts as an overflow device to prevent wastewater from flowing over the perimeter of berms 20. Control structure 28 is preferably a concrete plate which forms an overflow.

Figure 3:
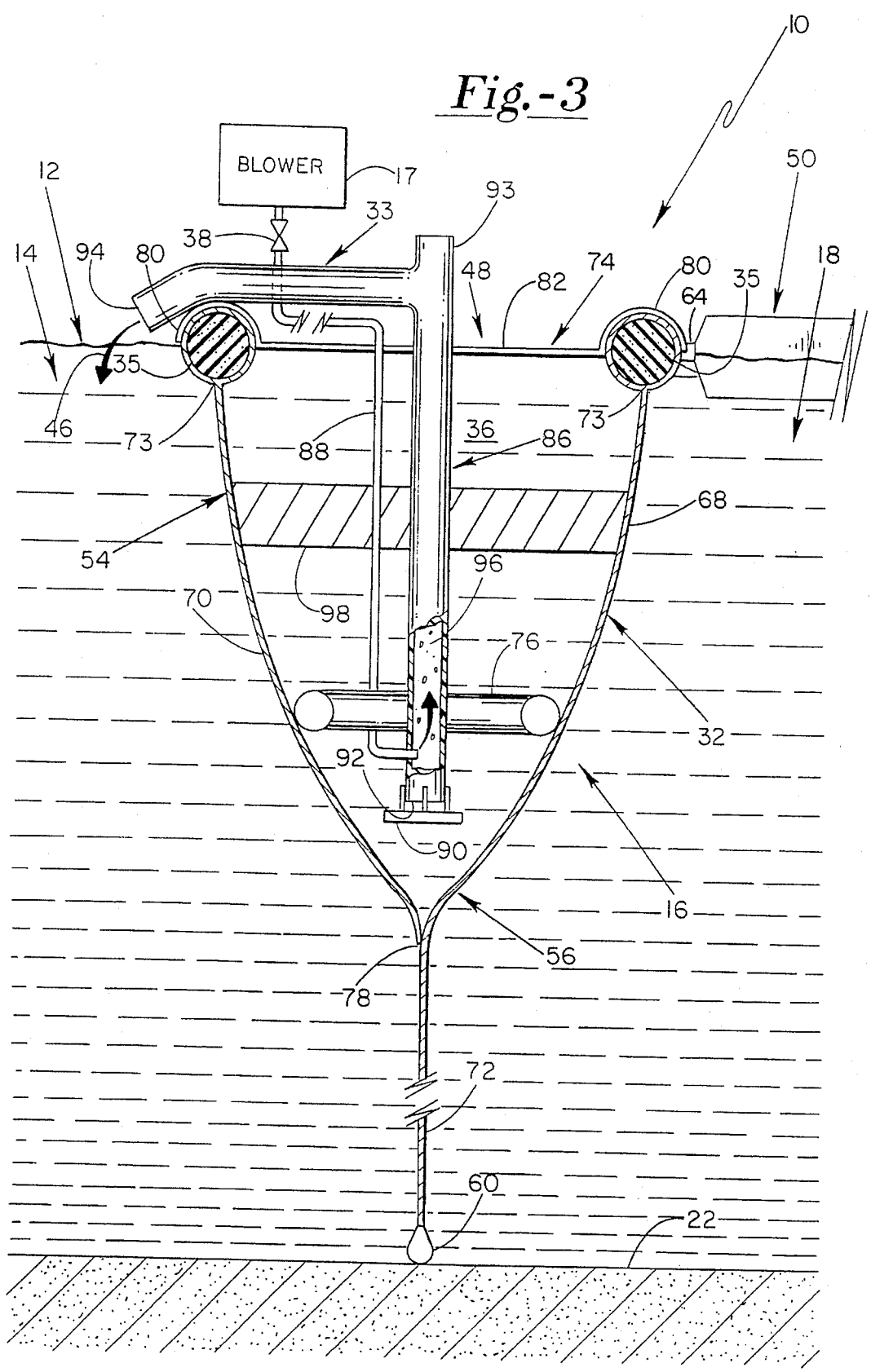
FIG. 3 is a cross-sectional view of the wastewater treatment system of FIG. 1 illustrating the in-pond clarifier in greater detail.

FIG. 3 illustrates clarifier 16 in much greater detail. In particular, FIG. 3 illustrates enclosure 32 and an individual air lift pump 33 in greater detail. As shown by FIG. 3, enclosure 32 includes flotation devices 35, clarifier chamber walls 68, 70, isolation wall 72, and frames 48. Flotation devices 35 float along the water surface and are coupled to walls 68 and 70. Flotation devices 35 are preferably made of high-density polyethylene. Alternatively, as can be appreciated, any variety of floating devices may be used such as foam or wood. Flotation devices 35 support walls 68 and 70 and suspend upper portion 54 of clarifier 16 adjacent to the water surface.

Clarifier chamber walls 68 and 70 are preferably formed by sheets or skirts of flexible generally non-porous material including both natural and artificial fabric, Kevlar, polyvinylchloride, polyethylene or hypalon. Because walls 68 and 70 are preferably formed from a flexible, lightweight material, clarifier 16 is less expensive, easier to set up, can be more easily collapsed and stored and is more easily suspended adjacent to the water surface. Alternatively, walls 68 and 70 may be formed more rigid with stronger materials such as metal, plastic, wood or the like. Upper ends of walls 68 and 70 are coupled to flotation devices 35. In the preferred embodiment, upper ends of walls 68 and 70 are wrapped around flotation devices 35 and are either sewn or welded along joints 73 to secure walls 68 and 70 to flotation devices 35.

Lower portion of clarifier enclosure 32 is formed by isolation wall 72. Isolation wall 72 is preferably formed from a generally lightweight, flexible, non-porous material. Isolation wall 72 is preferably made of the same material as walls 68 and 70. Because isolation wall 72 is flexible, isolation wall 72 better conforms to uneven contours of floor 22 of pond 12. Alternatively, isolation wall 72 may also be formed from more rigid materials such as metal, plastic, or wood. Isolation wall 72 is coupled to walls 68 and 70 and extends downward from clarifier chamber 36 to floor 22 of the pond in which clarifier 16 is to be suspended. In the preferred embodiment, isolation wall 72 is integral with wall 68 and wall 70 and is sewn or heat welded along longitudinal joint 78. Isolation wall 72 preferably has a height (a distance between joint 78 and floor 22) sufficient as to extend to floor 22 to form a seal with floor 22. As can be appreciated, in cases where the pond is shallow enough, isolation wall 72 may be omitted such that joint 78 is maintained against floor 22 to form a seal and to separate and substantially isolate treatment zones 14 and 18.

Isolation wall 72, or alternatively, joint 78 is maintained adjacent to the floor by weights 60 which are secured to a lower end of isolation wall 72 or, alternatively, joint 78. As discussed above, weighted member 60 is preferably a weighted chain. Alternatively, isolation wall 72 or joint 78 is maintained adjacent to and in contact with floor 22 by a variety of mounting or anchoring mechanisms such as hooks, bolts, anchors or other various attachment mechanisms.

FIG. 3 further illustrates an individual frame 48 in greater detail. For ease of illustration, only the relationship between frame 48 and an individual air lift pump 33 is shown. However, frame 48 supporting air lift pump 34 is identical to frames 48 which support air lift pump 33. As best shown in FIG. 3, each individual frame 48 includes an upper brace 74, a lower brace 76 and a vertical member (air lift pump 33) connecting upper brace 74 and lower brace 76. Upper brace 74 generally consists of at least two saddle support portions 80 and spanner 82. Saddle support portions 80 are generally semi-circular in shape and are sized so as to fit over and attach to :flotation devices 35. Spanner portion 82 extends between and is connected to saddle support portions 80. Spanner portion 82 is preferably coupled to an upper portion of air lift pump 33 so as to maintain the upper portion of air lift 33 in a vertical orientation. Saddle support portions 80 and spanner portion 82 engage flotation devices 35 to separate and maintain walls 68 and 70, and their respective flotation devices 35, in a spaced apart relation. As a result, the geometry of clarifier chamber 36 is maintained.

Brace 76 is preferably an H-shaped member having a middle leg extending between two side legs. The middle leg is coupled to a lower portion of air lift pump 33 so as to maintain the lower portion of air lift pump in a substantially vertical orientation. The middle leg has a length approximately equal to the desired width of the lower end of clarifier chamber 36. The two side legs engage and space apart walls 68 and 70. Preferably, brace 76 comprises PVC pipe fittings which are integrally formed with the lower portion of air lift pump 33. Alternatively, brace 76 is mounted to air lift pump 33.

Braces 74 and 76 are connected and spaced apart by air lift pump 33. As a result, brace 74 is maintained at a preselected distance from brace 76 within clarifying chamber 36. Because air lift pump also serves as the vertical member connecting upper brace 74 and lower brace 76, frame 48 requires fewer parts and is easier to manufacture as well as set up. Alternatively, a separate vertical member connecting upper brace 74 and lower brace 76 may be employed.

Because both brace 74 and brace 76 are preferably integral with or mounted to air lift pump 33, air lift pump 33 and frame 48 form a single integral or preassembled component which may be easily inserted into clarifier chamber 36 as a unit. As a result, the single component holds the air lift pump 33 in place, maintains the shape of clarifier chamber 36 and acts as a pump to remove settled solids from a lower end of clarifier chamber 36. Braces 74 and 76 alternatively may be releasably and adjustably coupled to air lift pump 33 so that air lift pump 33 may be removed, replaced or repaired as necessary without removing braces 74 and 76 or so that the depth which air lift pump extends into chamber 36 may be adjusted.

Braces 74 and 76 in conjunction with air lift pump 33 form frame 48 to support and space walls 68 and 70 of enclosure 32 to define the geometry of clarifier chamber 36. As can be appreciated, each frame 48 may have a variety of shapes and configurations to form the desired geometry of clarifying chamber 36. Furthermore, frame 48 may alternatively be a single elongate framing member extending across the entire length of enclosure 32.

Air lift pump 33 extends proximate the lower end of clarifier chamber 36 and includes tube 86, air supply line 88 and suction plate 90. Tube 86 is an elongate hollow tube extending from the lower portion of clarifier chamber 36 above flotation devices 80 and over the side of clarifier 16 towards treatment zone 14. Tube 86 is preferably integral with braces 74 and 76. Tube 86 includes an input end 92, a veto 93, a discharge end 94 and an interior 96. Settled solids within clarifier chamber 36 are drawn up through input end 92 and through interior 96 to discharge end 94 where the return activated sludge is returned to treatment zone 14.

Air supply line 88 is a hollow tube having a first end connected to one of air lines 37 of blower 17 (shown in FIG. 1) and a second end in communication with interior 96 proximate to input end 92 of tube 86. Air supply line 88 transfers compressed air from blower 17 to interior 96 of tube 86. The compressed air supplied through air supply line 88 bubbles or flows upward within interior 96 of tube 86 and thereby lifts the wastewater and suspended solids upward to where they are discharged out discharge end 94. The air within interior 96 exits tube 86 through vent 93. The volume of compressed air supplied to tube 86 may be selectively controlled by adjustment of valves 38. In turn, the rate at which suspended solids and wastewater are removed from clarifier chamber 36 and returned to treatment zone 14 may also be selectively controlled. To further control the rate at which sludge is removed from clarifier chamber 36, valves 38 are provided with timers whereby blower 17 supplies compressed air to pump 33 at only preselected time intervals.

Suction plate 90 is preferably a flat circular plate coupled to tube 86 below input end 92. Suction plate 90 is spaced from input end 92 so as to prevent enclosure 32 from clogging tube 86. As a result, suction plate 90 ensures a constant free flow of sludge form clarifier chamber 36 back to treatment zone 14.

As discussed above, air lift pump 34 (shown in FIG. 1) wastes settled solids or sludge from clarifier 16. Air lift pump 34 is identical to air lift pump 33 except that discharge end 94 of air lift pump 34 empties into a wasting facility or zone. As with air lift pump 33, the precise rate at which solids are removed from clarifier chamber 36 may be precisely controlled by adjusting the volume of compressed air supplied through air supply line 88 to tube 86. To further control the rate at which sludge is removed from clarifier chamber 36, valves 38 are provided with timers whereby blower 17 supplies compressed air to pump 34 at only preselected time intervals. Consequently, the rate at which settled solids are wasted from clarifier 16 is also controlled.

Air lift pumps 33 and 34 are inexpensive, easily maintained and are easily adjustable so as to control the rate at which solids are returned to treatment zone 14 or are wasted from clarifier 16. Because air lift pumps 33 and 34 merely rely upon compressed air to lift solids from clarifier chamber 36, expensive and high maintenance mechanical components are absent. In addition, air lift pumps 33 and 34 require little energy and lessen the shearing of biological floc. Air lift pumps 33 may be formed from lightweight plastic PVC tubing and material, thereby not requiring larger and more expensive flotation devices for their support.

As is shown by FIG. 3, clarifier 16 further includes optional tube settler 98. Tube settlers are well-known in the art and are used to improve the settling of suspended solids from wastewater within clarifiers. Tube settler 98 is preferably formed from PVC plastic and is formed as to define a plurality of rectangular tubes which are oriented approximately 35 degrees with respect to the vertical. Tube settler 98 extends across clarifying chamber 36 between walls 68 and 70 and further improves the rate at which solids within clarifying chamber 36 settle to the bottom of clarifying chamber 36.

Figure 4:
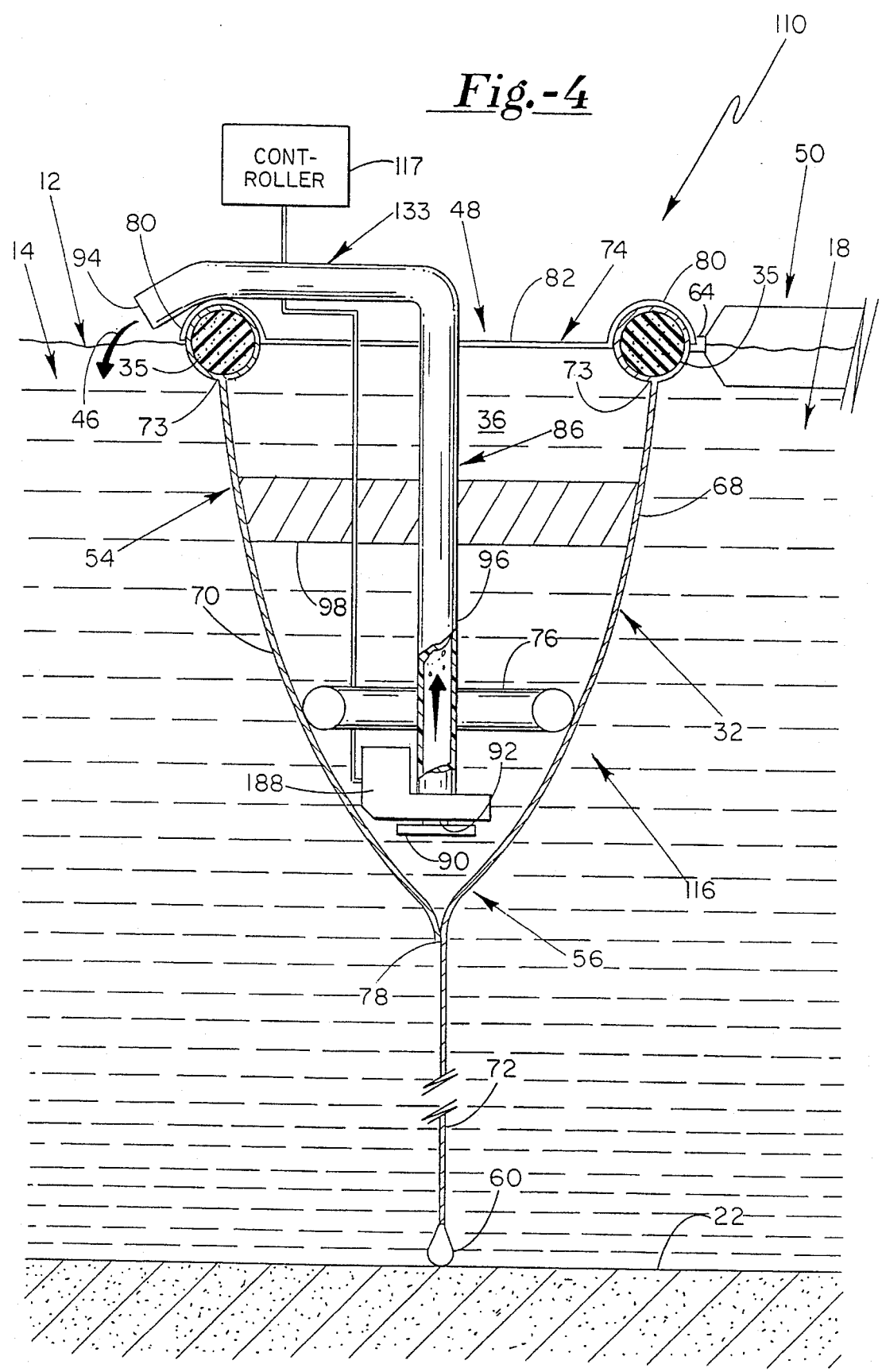
FIG. 4 is a cross-sectional view of an alternate embodiment of the in-pond clarifier shown in FIG. 3.

FIG. 4 is a cross-sectional view of an alternate embodiment (wastewater treatment system 110) of wastewater treatment system 10 shown in FIGS. 1–3. For ease of illustration, those elements of wastewater treatment system 110 which are the same as corresponding elements of wastewater treatment system 10 are numbered similarly. Wastewater treatment system 110 is similar to wastewater treatment system 10 except that wastewater treatment system 110 includes clarifier 116 and controller 117. Clarifier 116 includes anaerobic pump 133 in lieu of air lift pumps 33. Anaerobic pump 133 is substantially similar to air lift pump 33 except that an aerobic pump 133 includes anaerobic pumping mechanism 188 in lieu of air supply line 88. Anaerobic pumping mechanism 188 preferably comprises a submersible mechanical pump as is conventionally known. Pumping mechanism 188 is mounted to tube 86 near input end 92. Pumping mechanism 188 pumps return activated sludge through interior 96 of tube 86 out discharge end 94 into treatment zone 14. Pumping mechanism 188 pumps the return activated sludge mechanically and does not utilize air to lift the sludge. As a result, anaerobic pump 133 does not aerate the return activated sludge and is well suited for use with anaerobic or anoxic treatment processes.

Anaerobic pumping mechanism 188 is preferably connected to and controlled by controller 117 as schematically shown. Controller 117 actuates pumping mechanism 188 to control the rate at which sludge is removed from clarifier 116. As a result, the rate at which return activated sludge is removed from clarifying chamber 36 may be controlled. Although well suited for returning activated sludge to anaerobic or anoxic treatment processes, anaerobic pump 133 may also be used for returning sludge to aerobic treatment processes or for wasting sludge from the clarifying chamber. As can be appreciated, anaerobic pumping mechanism 188 may comprise any one of a variety of mechanical pumping means which do not use air to pump or lift the sludge.

Although the present invention has been described with reference to preferred embodiments, workers skilled in the art will recognize that changes may be made in form and detail without departing from the spirit and scope of the invention.

What is claimed is:

1. A clarifier enclosure for deployment within a pond having a floor and a wastewater surface and for use with solid removal means which removes settled solids from the enclosure, the enclosure including means for inputting wastewater into the enclosure and means for removing wastewater from the enclosure, the enclosure comprising:

a plurality of walls joined to one another so as to define a clarifying chamber adjacent to the wastewater surface;

an isolation wall extending downward from the plurality of walls, the isolation wall having a height so as to extend to the pond floor for dividing the pond into distinct treatment zones on opposite sides of the clarifying chamber; and a frame positioned within the clarifying chamber and engaging the plurality of walls, the frame including an upper brace, a lower brace and a vertical member connecting the upper brace and the lower brace.

2. The clarifier enclosure of claim 1 wherein the solid removal means comprises air lift pumps and wherein the air lift pumps are coupled to the frames and are supported by the frames at a fixed position.

3. The clarifier enclosure of claim 1 wherein the solid removal means comprises anaerobic pumps and wherein the anaerobic pumps are coupled to the frames and are supported by the frames at a fixed position.

4. The clarifier enclosure of claim 1 further including:

flotation devices coupled to the plurality of walls for suspending the plurality of walls adjacent to the water surface.

5. The clarifier enclosure of claim 1 further including:

a weight coupled to the isolation wall for maintaining at least a portion of the isolation wall adjacent to the pond floor.

6. The clarifier enclosure of claim 1 wherein the means for inputting includes an inlet between a first treatment zone and the clarifying chamber; and wherein the means for removing includes an outlet between the clarifying chamber and a second treatment zone.

7. The clarifier enclosure of claim 6 wherein the inlet and the outlet are located on opposite ends of the clarifier enclosure.

8. The clarifier enclosure of claim 1 wherein the plurality of walls define an inlet and an outlet and wherein the enclosure includes:

a baffle coupled to the plurality of walls and extending transversely across the clarifying chamber, wherein the baffle defines at least one flow passage sized so that the velocity of wastewater flow through the clarifying chamber is reduced.

9. The clarifier of claim 1 wherein the solid removal means comprises a pump having a tube through which settled solids are removed from the clarifying chamber, wherein the tube comprises the vertical member interconnecting the first and second braces.

10. A clarifier for deployment in a wastewater pond having a floor and a wastewater surface, the clarifier comprising:

a baffle suspended across the wastewater pond to divide the wastewater pond into distinct treatment zones, the baffle including:
 a plurality of fabric skirts extending between the wastewater surface of the pond and the floor, wherein the skirts are connected so as to define a clarifying chamber distinct from the treatment zones;
 a frame positioned within the clarifying chamber and engaging the plurality of fabric skirts, the frame including an upper brace, a lower brace and a vertical member connecting the upper brace and the lower brace;
 means for maintaining a portion of the fabric skirts adjacent to the surface of the pond; and
 means for maintaining a portion of at least one of the fabric skirts adjacent to the floor of the pond; and
an inlet for permitting wastewater to flow into the clarifying chamber;
an outlet for permitting wastewater to flow out of the clarifying chamber; and
means for removing settled solids from the clarifying chamber.

11. The clarifier of claim 10 wherein the means for maintaining a portion of the fabric skirts adjacent to the water surface includes:
flotation devices coupled to the fabric skirts.

12. The clarifier of claim 10 wherein the means for maintaining a portion of the fabric skirts adjacent to the floor of the pond includes:
a weight coupled to at least one of the plurality of fabric skirts.

13. The clarifier of claim 10 wherein the means for removing settled solids includes an air lift pump including a tube extending from within the clarifying chamber over at least one of the of fabric skirts to discharge solids into one of the distinct treatment zone adjacent said at least one of the fabric skirts.

14. The clarifier of claim 10 wherein the means for removing settled solids includes an air lift pump and wherein the frame is coupled to the air lift pump to support the air lift pump at a fixed location.

15. The clarifier of claim 10 further including:
a tube-settler module within the clarifying chamber to improve the settling of solids from the wastewater within the clarifying chamber.

16. The clarifier of claim 10 including:
a baffle coupled to the plurality of fabric skirts and extending across the clarifying chamber, wherein the baffle defines at least one flow passage so that the velocity of wastewater flow through the clarifying chamber is reduced.

17. The clarifier of claim 10 wherein the means for removing settled solids comprises a pump having a tube through which settled solids are removed from the clarifying chamber, wherein the tube comprises the vertical member interconnecting the first and second braces.

18. A clarifier for deployment in a wastewater pond having a floor and a wastewater surface, the clarifier having means for inputting wastewater into the clarifier and means for removing wastewater from the clarifier, the clarifier comprising:

a plurality of walls joined to one another so as to define a clarifying chamber adjacent to the wastewater surface;

first solid removal means for removing settled solids from the clarifying chamber and for returning the settled solids to the wastewater pond, the first solid removal means being located towards the means for removing wastewater from the clarifier; and second solid removal means distinct from the first solid removal means for removing settled solids from the clarifying chamber and for wasting the settled solids removed by the second solid removal means, the second solid removal means being located towards the means for inputting wastewater into the clarifier.

19. The clarifier of claim 18 wherein the first solid removal means includes at least one air lift pump and wherein the second solid removal means includes at least one air lift pump.

20. The clarifier of claim 18 wherein the first solid removal means includes at least one anaerobic pump and wherein the second solid removal means includes at least one anaerobic pump.

21. The clarifier of claim 18 wherein the plurality of walls defines an outlet and an inlet, wherein the first solid removal means is located towards the outlet and wherein the second solid removal means is located towards the inlet.

22. The clarifier of claim 18 wherein the first solid removal means returns the settled solids to the wastewater pond through a plurality of discharge outlets.

23. The clarifier of claim 18 wherein the clarifier is deployed in the wastewater pond across opposite ends of the pond and wherein the first solid removal means returns settled solids to the wastewater adjacent to the plurality of walls far from other sides of the wastewater pond.

24. The clarifier of claim 18 wherein at least one of the plurality of walls is made of a flexible material.

25. The clarifier of claim 18 including:
an isolation wall extending downward from the plurality of walls, the isolation wall having a height so as to extend to the pond floor for dividing the pond into distinct treatment zones on opposite sides of the clarifying chamber.

26. The clarifier of claim 18 including:
a first control mechanism operably coupled to the first solid removal means for controlling the rate at which the first solid removal means removes settled solids from the clarifying chamber and returns settled solids to the wastewater pond; and
a second control mechanism operably coupled to the second solid removal means for controlling the rate at which the second solid removal means removes settled solids from the clarifying chamber and wastes the settled solids, wherein the rates at which the first solid removal means and the second solid removal means remove settled solids from the clarifying chamber are not necessarily equal.

27. The clarifier of claim 26 wherein at least one of the first and second control mechanisms includes a timing mechanism so that settled solids are removed from the clarifying chamber at preselected timed intervals.

28. A wastewater treatment system for deployment in a body of water having a floor and a wastewater surface, the system comprising:

an in-pond clarifier extending across the body of water, the in-pond clarifier defining a clarifying zone and including:
  walls joined to one another to define the clarifying zone;
  a frame within the clarifying zone and engaging the walls, the frame including an upper brace, a lower brace and a vertical member interconnecting the upper brace and the lower brace;
  means for inputting wastewater into the clarifying zone and means for removing wastewater from the clarifying zone; and
  an upper portion supported above the wastewater surface; and
  a lower portion maintained adjacent to the floor of the body of water to divide the body of water into distinct treatment zones on opposite sides of the clarifying zone.

29. The wastewater treatment system of claim 28 wherein the in-pond clarifier divides the body of water into a first distinct treatment zone and a second distinct treatment zone and wherein the clarifier further includes:
  an inlet and an outlet, the inlet permitting wastewater to flow from the first treatment zone into the clarifier such that the suspended biological solids within the wastewater settle within the clarifier, the outlet permitting wastewater to flow out of the clarifier into the second treatment zone.

30. The wastewater treatment system of claim 28 including:
  a pump having a tube extending within the clarifying zone for removing settled solids from the clarifying zone, wherein the tube comprises the vertical member interconnecting the first and second braces.

31. A wastewater treatment system comprising:
  a pond having a floor, a plurality of sides, an inlet, an outlet and a wastewater surface;
  a first treatment zone adjacent to the inlet, the first treatment zone containing wastewater having suspended biological solids carrying bacteria, wherein the first treatment zone includes mixers for mixing the biological solids and the wastewater;
  a second treatment zone adjacent to the outlet, the second treatment zone including aquatic plants adjacent to the water surface;
  a clarifier extending across the pond from the water surface to the pond floor to separate the first treatment zone from the second treatment zone and to permit suspended biological solids carrying bacteria within the wastewater to settle and to be returned to the first treatment zone; and
  a pump within the clarifier for returning settled solids to the first treatment zone.

32. The wastewater treatment system of claim 31 wherein the second treatment zone includes floating barrier grids suspended adjacent to the water surface.

33. A clarifier comprising:
  at least one framing member;
  at least one non-porous fabric sheet coupled to the framing member to define an elongate clarifying chamber having an inlet and an outlet;
  a plurality of pumps spaced from one another along the elongate chamber for removing settled solids from the clarifying chamber;
  a fabric skirt coupled to at least one fabric sheet and extending downward for engaging the bottom of a pond; and
  means for maintaining a portion of the fabric skirt adjacent to the bottom of the pond to separate the pond into separate treatment zones.

34. The clarifier of claim 33 wherein the framing member is formed by PVC tubing.

35. The clarifier of claim 33 wherein the clarifier has a V-shaped cross-section.

36. The clarifier of claim 33 wherein the plurality of pumps are mounted to the flaming member at fixed positions.

37. The clarifier of claim 33 further including:
  floats coupled to at least one non-porous fabric sheet for suspending the clarifier within a pond.

38. The clarifier of claim 37 wherein the framing member includes:
  a first brace engaging and extending between the floats;
  a second brace within the clarifying chamber below the first brace; and
  a vertical member interconnecting the first and second braces.

39. The clarifier of claim 38 wherein at least one of the plurality of pumps includes:
  a tube through which settled solids are removed from the clarifying chamber, wherein the tube comprises the vertical member interconnecting the first and second braces.

40. The clarifier of claim 33 wherein the means for maintaining a portion of at least one fabric skirt adjacent to the bottom of the pond includes:
  a chain weight coupled to the portion of at least one fabric skirt.

41. The clarifier of claim 32 further including:
  tube-settlers within the clarifying chamber.

* * * * *

UNITED STATES PATENT AND TRADEMARK OFFICE
CERTIFICATE OF CORRECTION

PATENT NO. : 5,534,141　　　　　　　　　　Page 1 of 2
DATED : JULY 9, 1996
INVENTOR(S) : DAVID W. MCANANEY, JOHN R. DORNER It is certified that error appears in the above-indentified patent and that said Letters Patent is hereby corrected as shown below:

On the Title Page [56] the following references were missing:

| | | | | | |
|---|---|---|---|---|---|
| AA | 2,188,162 | 01/23/40 | Schulhoff | 210 | 7 |
| AB | 3,385,786 | 05/28/68 | Klock | 210 | 12 |
| AC | 3,760,946 | 09/25/73 | Boler | 210 | 152 |
| AD | 4,274,838 | 06/23/81 | Dale et al. | 48 | 111 |
| AE | 4,530,762 | 07/23/85 | Love | 210 | 603 |
| AF | 4,663,044 | 05/05/87 | Goronszy | 210 | 610 |
| AG | 4,885,094 | 12/05/89 | Srinivasan et al. | 210 | 610 |
| AH | 5,137,636 | 08/11/92 | Bundgaard | 210 | 605 |
| AI | 5,185,079 | 02/09/93 | Dague | 210 | 603 |
| AJ | 5,338,452 | 08/16/94 | Pidaparti | 210 | 603 |

Col. 5, line 5, delete "floe", insert --floc--

Col. 5, line 6, delete "floe", insert --floc--

Col. 12, line 43, delete "veto", insert --vent--

UNITED STATES PATENT AND TRADEMARK OFFICE
CERTIFICATE OF CORRECTION

PATENT NO. : 5,534,141
DATED : July 9, 1996
INVENTOR(S) : David W. Mcananey, et. al.

It is certified that error appears in the above-indentified patent and that said Letters Patent is hereby corrected as shown below:

Col. 13, line 3, delete "from", insert --from--.

Signed and Sealed this

Nineteenth Day of November, 1996

Attest:

BRUCE LEHMAN

*Attesting Officer*      *Commissioner of Patents and Trademarks*